Nov. 9, 1954   E. WILDHABER   2,693,720
LOCKING DIFFERENTIAL

Filed July 6, 1951   2 Sheets-Sheet 1

INVENTOR.
ERNEST WILDHABER
BY
ATTORNEY

Nov. 9, 1954  E. WILDHABER  2,693,720
LOCKING DIFFERENTIAL
Filed July 6, 1951  2 Sheets-Sheet 2

INVENTOR.
ERNEST WILDHABER
BY
ATTORNEY

United States Patent Office 2,693,720
Patented Nov. 9, 1954

2,693,720

LOCKING DIFFERENTIAL

Ernest Wildhaber, Brighton, N. Y.

Application July 6, 1951, Serial No. 235,546

20 Claims. (Cl. 74—714)

The present invention relates to gear differentials and particularly to gear differentials of the locking type for use in automotive vehicles.

When one of the drive wheels of an automotive vehicle gets into the mud or on an icy spot it loses its traction and ordinarily it will start to spin or race so that the driving power transmitted through the differential to the opposite wheel will be considerably diminished. Under bad mud or ice conditions there may not be enough traction to move the vehicle. For this reason various types of differentials have been proposed in which one of the side gears of the differential is locked against rotation, or partially locked against rotation, relative to the driving member, when slippage occurs, so that the slippage may be halted and transmission of power may be achieved. I have disclosed in my pending U. S. patent application Serial No. 170,610, filed June 27, 1950, a locking differential of this type. The present invention constitutes a modification and improvement over the locking differential of that application.

The differential of the present invention uses three coaxial gears of different tooth numbers that are interconnected by planetary pinions. One of the coaxial gears is the driver which receives torque from the motor. The other two coaxial gears transmit the split-up torque to the wheels. In a preferred embodiment of the invention the three coaxial gears are cylindrical internal gears having substantially the same tooth diameters.

In differentials of the type referred to, relative motion of the two gears, which transmit the split-up torque, causes the planet pinions to roll around at a much increased rate. Thus, in one embodiment of the invention they roll around about nine times per relative turn of the two gear members. A large number of teeth get into mesh in this way. For this reason, this type of differential is singularly adapted to serve as a fluid brake, which acts increasingly with increasing relative speed and which prevents wheel spinning while permitting the slow differential action which is required in normal operation of the vehicle, to occur. When so used, a cage is added which obstructs the free flow of oil from the pressure side of the gears to the suction side. A large volume of oil is displaced in the rapid planetary motion so that a sufficient locking effect is attainable without excessive pressures. When hydraulic locking is provided it is desirable to keep the other friction down.

One object of the present invention is to obtain improved control of the locking action.

Another object of the invention is to provide a differential with which less severe but completely satisfactory locking action can be obtained with a simple and compact construction.

Another object of the invention is to provide a differential having three coaxial gears in which friction, other than for locking, may be kept down to a desired level while permitting a large volume of oil to be displaced through the rapid planetary motions of the pinions.

Another object of the invention is to attain the last recited purpose by use of rollers which bear against shaft projections of the planet pinions.

A further object of the invention is to provide a differential of the character described in which rollers are employed to keep the planet pinions in mesh with the coaxial gears of the differential while reducing friction in normal use of the differential.

Other objects of the invention will be apparent hereinafter from the specification and from the recital of the appended claims.

Figure 1:
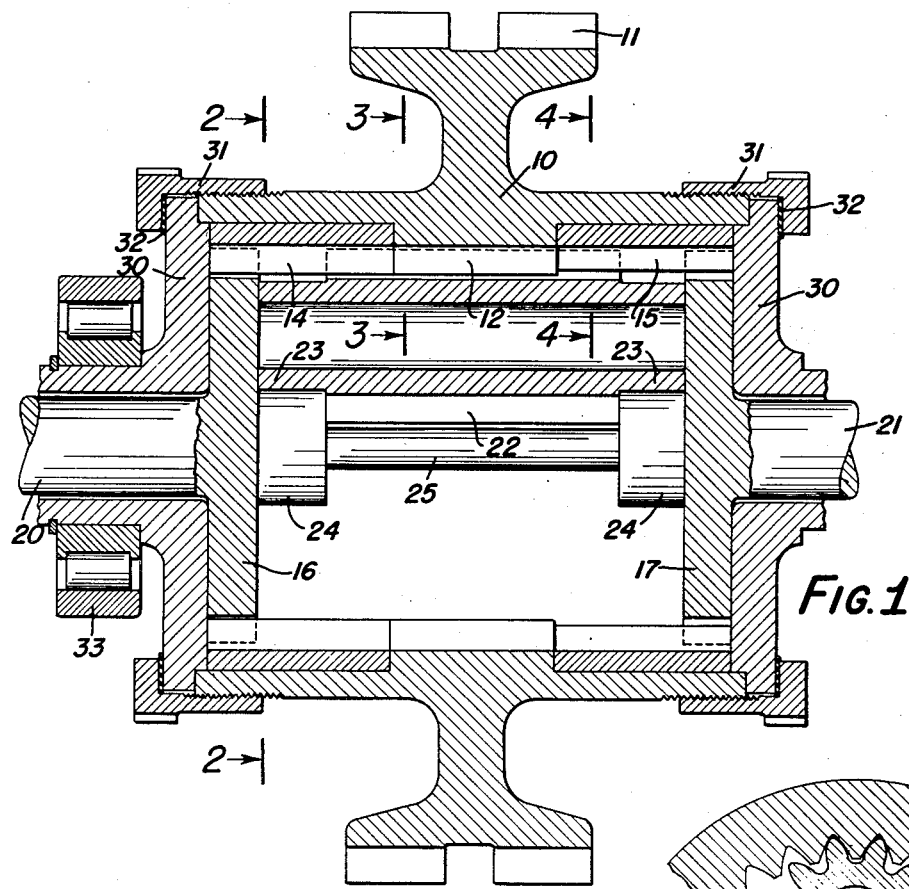
Fig. 1 is an axial section of an automotive differential constructed according to one embodiment of the present invention.
Figure 3:
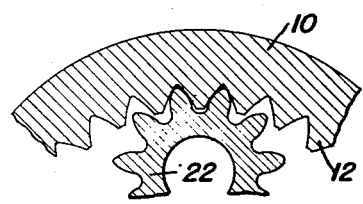
Fig. 3 is a fragmentary section taken on the line 3—3 of Fig. 1, looking in the direction of the arrows, and showing the mesh of one of the planet pinions with the internal driving gear.
Figure 2:
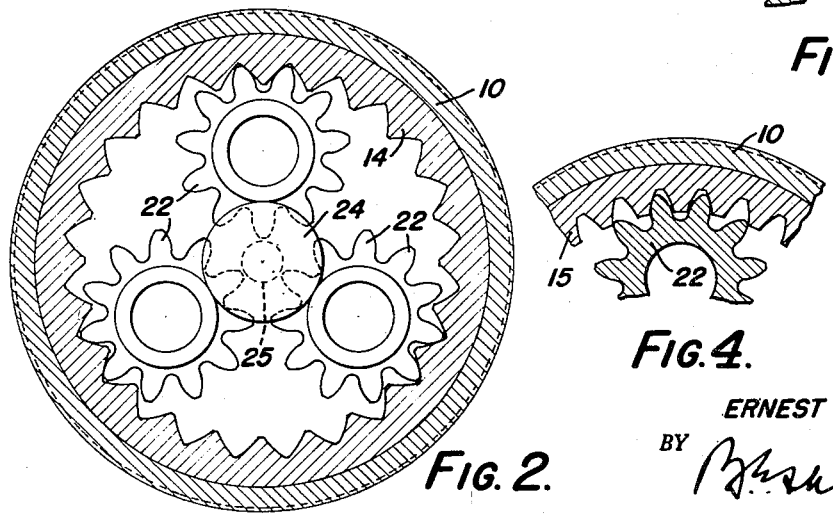
Fig. 2 is a section on the line 2—2 of Fig. 1, looking in the direction of the arrows.
Figure 4:
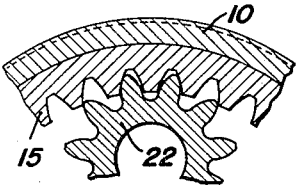
Fig. 4 is a similar fragmentary section taken on the line 4—4 of Fig. 1, looking in the direction of the arrows, and showing the mesh of said one planet pinion and one of the internal side gears.

Referring first to the embodiment of the invention illustrated in Figs. 1 to 5 inclusive, 10 denotes the housing of the differential. This differential housing may be driven by a herringbone gear 11 as is usual in double-reduction axles. The herringbone gear 11 may be integral with the differential housing or secured thereto in any conventional manner.

Integral with the differential housing 10, also, is an internal gear 12. Rotatably mounted within the differential housing at opposite sides of the internal gear 12 are two internal gears 14 and 15. These are in the form of internally toothed sleeves. These transmit the divided torque to opposite wheels of the vehicle through externally toothed discs 16 and 17, respectively, whose teeth match the internal teeth of the sleeves 14 and 15, respectively, and mesh with those internal teeth, thus forming rigid couplings. The discs 16 and 17 are formed integral with the axle shafts 20 and 21, respectively, of the two coaxial driven wheels of the vehicle.

The three coaxial internal gears 14, 12, and 15 have, respectively, different tooth numbers. Thus, in the embodiment illustrated, the driver 12 has twenty-seven teeth and the side gears 14 and 15 have twenty-four and thirty teeth, respectively.

The three coaxial internal gears 14, 12, and 15 are operatively connected by three planet pinions 22. These three planet pinions are identical. The tooth profiles and tooth dimensions of each are constant along the full length of the teeth of each pinion; and each pinion is of sufficient axial length, as clearly shown in Fig. 1, to mesh simultaneously with all three internal gears 14, 12, and 15. The three coaxial gears 14, 12 and 15 having different tooth numbers, when meshing with a pinion 22 have different pitch circles. The pitch radii of the pinion and the respective gears are proportional to the tooth numbers of the pinion and of each gear. The middle gear 12 has a pitch circle diameter, therefore, intermediate the pitch circle diameters of the side gears 14 and 15. The side gears 14 and 15, therefore, possess a mechanical leverage on each side of the pitch circle of the gear 12. This relationship is well known and is explained more fully in my pending U. S. patent application Serial No. 170,610 referred to above.

The pinions 22 shown have straight teeth, that is, they are spur pinions. They might also be helical pinions if desired. In the latter case, of course, the internal gears would also have to be helical. All of the internal gears 14, 12, and 15, are simply made conjugate to the same pinion, at ratios corresponding to the ratio of the tooth numbers of each internal gear and pinion.

The teeth of the internal drive gear 12 are preferably made long enough to prevent lateral tipping of the pinions.

Each pinion 22 has shaft projections 23 at opposite ends. These shaft projections are engaged by a pair of cylindrical rollers 24 (Figs. 1 and 5), that are connected by an integral stem 25 for added rigidity. The rollers 24 center themselves on the three pinions and maintain the pinions in engagement with the teeth of the internal gears. The rollers 24 are of sufficient diameter to contact simultaneously with the shaft projections of the three pinions 22; and the rollers 24 center themselves on the three pinions and maintain the pinions in engagement with the teeth of the internal gears 14, 12 and 15.

Figure 5:
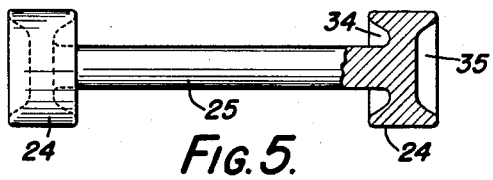
Fig. 5 is a side view of the locating roller pair used in the embodiment of the invention illustrated in Fig. 1.

In Fig. 5 the centering rollers 24 are shown in detail. If desired each may be provided with recesses 34 and 35 at opposite sides.

Relative motion of the two side gears 16 and 17, such as occurs when one of the driven wheels of an automobile vehicle slips in the mud or on ice, causes the pinions 22 to roll around rapidly. This causes friction on the teeth, which mesh with sliding as well as rolling contact, and results in a partial locking effect. The locking effect is reduced, however, as compared with the locking effect achieved with the differentials illustrated in my prior application above mentioned through use of the centering and spacing rollers 24. Further control of the locking effect is obtained through selection of the size of the planet pinions, that is, their tooth number. Increasing the tooth number of the planets as compared with given gear tooth numbers tends to reduce the friction and to reduce the locking effect. Reduction in tooth number of the planet pinions increases the friction. Increasing the pinion tooth number results in a reduced center distance and in a reduced relative turning motion about the instantaneous axis per relative turn of the two side gears 14 and 15. Thus, with internal gears of twenty-four, twenty-seven and thirty teeth, respectively, an eleven tooth pinion, such as shown, gives less friction than a nine tooth pinion would. A close control of the locking effect is thereby attained. In the present invention planet pinions may also be provided whose tooth numbers are larger than one third of the tooth number of the internal driving gear 12. Thus, with the present invention a more moderate locking effect is attainable.

Secured to the end of the differential housing are end plates 30. These serve to enclose the gears and pinions of the differential and the coupling discs 16 and 17. They may be fastened in position by nuts 31 that thread onto opposite ends of the differential housing and press the plates 30 against the differential housing through gaskets 32. The differential housing is supported by axially-spaced anti-friction bearings, which engage the end plates 30. One of these bearings is shown at 33 in Fig. 1.

The differential of the present invention may be used in automotive axles including four wheel drives or multiple axle drives, and for splitting up torque between different axles.

In the embodiment of the invention described the tooth numbers of the side gears 14 and 15 differ equally from the tooth number of the driving gear 12. In this case, the torque transmitted to the two side gears 14 and 15 would be in the proportion of the tooth numbers of these side gears if there were no friction. In the embodiment described, the torque at zero friction would be in the proportion of the tooth numbers thirty and twenty-four or five to four. To tend to transmit more torque to the rear wheels of a four wheel drive, the side gear of larger tooth number is connected with the drive shaft of the rear wheels; and the side gear of smaller tooth number is connected with the drive shaft of the front wheels. If more difference is desired, the difference ΔN of the tooth numbers of the side gears 14 and 15 from the tooth number of the middle gear 12 may be increased. In addition, the different differences ΔN may be used on the two side gears 14 and 15. The differences should be divisible by the number of planet pinions 22 used.

This procedure is also feasible in the case of differentials used simply for transmitting torque to the two wheels of a single axle. It is then possible to achieve transmission of equal torque to the two side gears 14 and 15 at zero friction.

Ordinarily, a moderate difference of torque of the two side gears at zero friction is accepted as occurs with equal differences ΔN. The side gear with larger tooth number is preferably connected with the wheel which is nearer to the center of the road, that is, with the left hand wheel. The moderate difference in traction is bridged over by the presence of friction in straight driving. Curves are ordinarily taken with little or no driving load so that a moderate difference in torque proportion is of no consequence.

Figure 6:
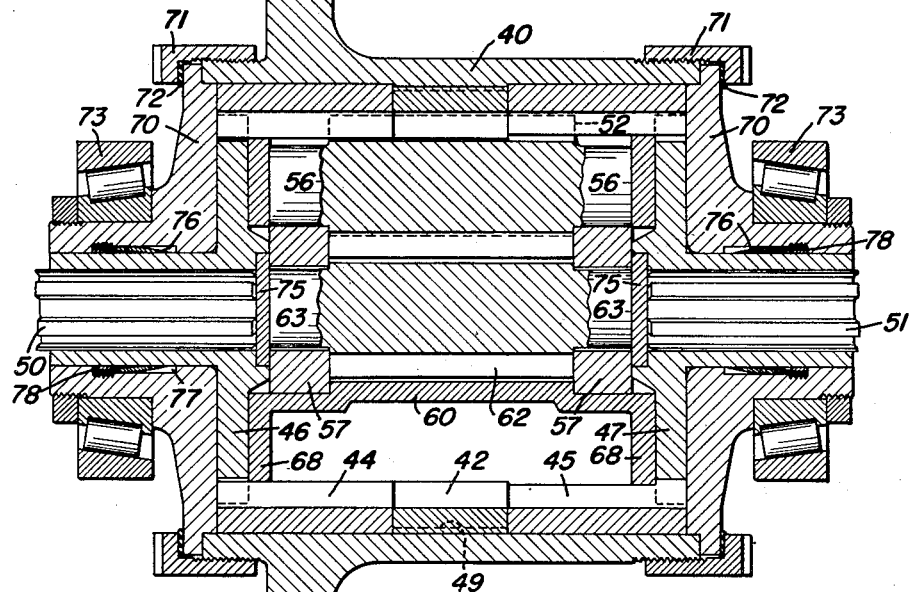
Fig. 6 is an axial section of an automotive differential constructed according to a modification of the present invention.
Figure 8:
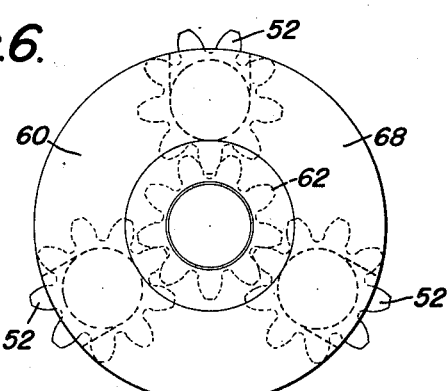
Fig. 8 is an end view of the cage.

Referring now to the modification of the invention illustrated in Figs. 6 and 8, 40 denotes the differential housing. In this case the differential housing 40 is shown as driven by a bevel or hypoid gear 41 which is bolted to the housing by bolts 43. The differential housing, however, might be driven by a herringbone gear such as shown in Fig. 1 or through any conventional drive.

Again, there is an internal gear for transmitting the drive. This internal gear 42 may be formed, as before, integral with the differential housing, or it may be coupled thereto by coupling teeth 49. Again there are journaled in the housing at opposite sides of the internal gear 42 other internal gears 44 and 45 which constitute, respectively, the side gears of the differential. Again these side gears are connected to the axle shafts 50 and 51, respectively, by toothed discs 46 and 47, respectively, which have teeth matching the internal teeth of the internal gears 44 and 45, respectively, so as to form with such internal gears rigid toothed couplings. In the embodiment of the invention shown in Fig. 6, however, the discs 46 and 47 are internally splined to have splined connection with the axle shafts 50 and 51, respectively. As in the first described embodiment of the invention the tooth zones of the three coaxial gears 44, 42 and 45 have substantially equal diameters but their tooth numbers differ. These gears may have, for instance, twenty-four, twenty-seven and thirty teeth, respectively. The differential again has three planet pinions 52 whose teeth mesh simultaneously with the three internal gears 44, 42 and 45. In the instance shown, each planet pinion has nine teeth.

Figure 7:
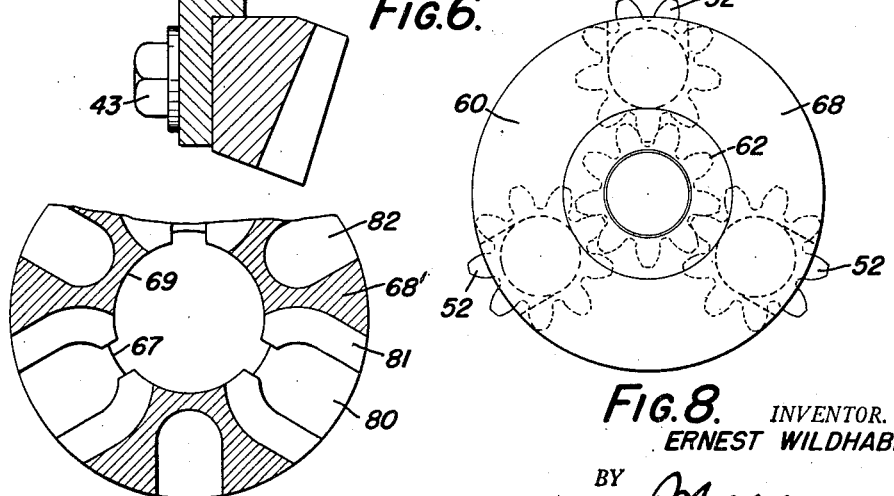
Fig. 7 is a fragmentary section of the cage used in the embodiment of the invention shown in Fig. 6 for creating fluid pressure.

In the embodiment of the invention shown in Figs. 6 to 8 inclusive locking effect is obtained by hydraulic action. The differential housing is filled with oil. This oil is squeezed out at the entering side of the meshing gear teeth and drawn in at the leaving side. The free circulation of oil between said sides is obstructed by a cage member 60 so that pressure may be created and hydraulic braking or locking may occur. This hydraulic braking or locking action increases rapidly with increasing relative speed, that is, with increased speed of differentiation; and that is just what is desired. In this way wheel spinning is eliminated while differentiation is unhampered at the slow speeds of ordinary operation.

To embody a hydraulic locking effect in a differential with three coaxial gears movable relative to one another is particularly fortunate because of the rapid mesh and the large volume of oil displaced in this type of differential. This permits obtaining the desired locking effects without prohibitive pressures.

In this embodiment of the invention a central gear 62 is employed which is intended to be coaxial with internal gears 44, 42 and 45. This gear 62 meshes with all three of the pinions 52 and prevents lateral tipping of the pinions. It also doubles the volume of oil displaced during differentiation.

Each planet pinion 52 meshes with all three internal gears, 44, 42 and 45, that is, with the internally toothed sleeves or side gears 44 and 45 as well as with the driving gear 42. At opposite ends, each planet pinion 52 is formed with cylindrical shaft projections 56. These shaft projections 56 are engaged by a pair of rollers 57. The rollers 57 are bored to fit over shaft projections 63 formed at opposite ends of the center gear 62, and they have bores slightly larger in diameter than the shaft projections 63. Hence, the rollers float and are centered by their engagement with the shaft projections 56 of the pinions 52. Under correct meshing conditions the rollers are coaxial with spacer gear 62 and internal gears 44, 42 and 45.

The differential housing is closed at opposite ends by end members 70 which are secured to the housing 40 at opposite ends by the nuts 71 that thread onto the housing and that engage gaskets 72 which are interposed between the nuts and the end members 70. End members 70 seat in the anti-friction bearings 73 on which the differential is mounted and journaled.

The differential may hold its own supply of oil. To prevent leakage, discs 75 are pressed into the inside ends of the coupling discs 46 and 47, and oil seals 76 are provided in the end members 70 to engage the peripheries of the coupling members 46 and 47. The oil seals may be held tight in recesses 77 in the end members 70 by snap rings 78. Each snap ring engages the associated seal internally at one end and presses the end of the seal against a corrugated portion of the associated recess 77. Oil pressure will press the circular sealing lids 76 tightly against the hubs of end members 70. Any other known suitable oil seals may be used in place of the seals 75 and 76 or in addition thereto.

The cage 60 may be made as a precision casting or it may be pressed from a suitable material. It is preferably used as cast or pressed except for the machining of the bore portions 67 which ride on the rollers 57. This cage member has flanges 68 at opposite ends and is formed with webs $68^1$ (Fig. 7) between its ends. The shaft portion of the cage has an internal bore 69 within which the centering gear 62 is mounted; and this bore is enlarged at 67 to receive the rollers 57. The webs $68^1$ of the cage are formed with pockets 80 which receive the hub portions 56 of the pinions 52 and these webs are also formed with pockets 81 communicating with the pockets 80. The pockets 81 receive the toothed portions of the pinions 52 and closely fit around the toothed portions of the pinions. Between recesses 81 the webs $68^1$ are recessed as denoted at 82 to reduce the weight of the cage.

In most conventional differentials the planet carrier is directly connected with the drive gear; and if one side gear is held stationary the other side gear goes twice as fast as the planet carrier. It takes two full turns of one side gear relative to the other side gear, then, in a conventional differential, to get a side gear to have mesh all around its teeth with the teeth of a planet pinion. In the differential of the present invention the planet pinions revolve at a faster rate around the side gears than in a conventional differential because of the difference in tooth numbers of the side gears. Hence, if a differential constructed according to the present invention is used as a gear pump proportionately more oil is displaced per two relative turns of the side gears than would be the case with similarly used conventional differentials. Hence, with a differential constructed according to this invention a given pressure increase corresponds to a proportionately larger amount of energy consumed in the oil and to a proportionately larger braking or locking effect.

In accordance with the present invention rollers 57 and the cage 60 are combined in a differential with three coaxial gears 44, 42 and 45 movable relatively to one another to reduce the general friction to a desired level. This results in a simple differential with hydraulic locking effect and with most desirable operational characteristics.

I have shown examples of differentials with three coaxial internal gears only. This represents the preferred construction at present.

When the term "cage" is used in the specification or claims it is intended to differ from a carrier in that it is not mounted by itself. It derives its position from the pinions. The term "cage" is understood to designate structure partially surrounding the pinion. It is meant to include structure applied individually to the pinions or to the spaces between. It does not necessarily have to be a single connected structure.

Still further modifications of the invention may be provided.

While the invention has been described, then, in connection with different embodiments thereof it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:
1. An automotive differential comprising a rotatable housing, a cylindrical gear connected to said housing to rotate therewith, two cylindrical gears mounted rotatably in said housing coaxially with the first gear, a plurality of cylindrical planet pinions positioned within said housing, each of which meshes with all three of said gears, each of said pinions having a single set of teeth and being provided at both its ends with shaft projections, and rolling means for transmitting pressure to the shaft projections of each pinion only in a plane radial of the pinion axis to maintain the pinions in engagement with said gears, said plane containing the pinion axis and the axis of said coaxial gears.

2. An automotive differential comprising a rotatable housing, a cylindrical gear connected to said housing to rotate therewith, two cylindrical gears mounted rotatably in said housing coaxially with the first gear, said two last-named cylindrical gears being disposed at opposite sides of the first cylindrical gear, said three gears having substantially equal tooth zone diameters but, respectively, different tooth numbers, a plurality of cylindrical planet pinions positioned within said housing, each of which meshes with all three of said gears, each of said pinions being provided at both its ends with shaft projections, and two coaxial rollers mounted between the pinions to act on the shaft projections, respectively, at opposite ends of all the pinions to apply radial pressure thereto.

3. An automotive differential comprising a rotatable housing, an internal gear connected to said housing to rotate therewith, two internal gears rotatably mounted in in said housing coaxially with the first gear, said three gears having substantially equal tooth zone diameters but, respectively, different tooth numbers, a plurality of cylindrical planet pinions positioned within said housing, each of which meshes with all three gears, each of said pinions being provided at both its ends with shaft projections, and a pair of coaxial rollers mounted between the pinions to act on the shaft projections at, respectively, opposite ends of all the pinions simultaneously.

4. An automotive differential comprising three coaxial gears rotatable relative to one another about their common axis, a plurality of planet pinions, each of which meshes with all three gears and each of which has shaft projections at its opposite ends, and a pair of rollers coaxial with one another and mounted between the pinions to engage directly the shaft projections at opposite ends, respectively, of all the pinions simultaneously.

5. An automotive differential comprising three coaxial gears rotatable relative to one another about their common axis, a plurality of planet pinions, each of which meshes with all three gears and each of which has shaft projections at its opposite ends, and a pair of rollers coaxial with one another and mounted between the pinions to engage, respectively, the shaft projections at opposite ends of all the pinions simultaneously, said pair of rollers being formed integral with one another and being connected by a stem portion of reduced diameter.

6. An automotive differential comprising three coaxial gears rotatable relative to one another about their common axis, a plurality of planet pinions, each of which meshes with all three coaxial gears, a central gear mounted between said pinions in mesh with all said pinions, and a pair of rollers coaxial with said central gear and engaging all said pinions simultaneously.

7. An automotive differential comprising three coaxial gears rotatable relative to one another about their common axis, a plurality of planet pinions, each of which meshes with all three coaxial gears and each of which has shaft projections at its opposite ends, a central gear mounted between said pinions in mesh with all said pinions, and a pair of rollers coaxial with said central gear and engaging, respectively, the opposite shaft projections of all the pinions.

8. An automotive differential with hydraulic locking action comprising three coaxial gears rotatable relative to one another about their common axis, a plurality of planet pinions, each of which meshes with all three coaxial gears, a cage member fitting closely about at least part of the periphery of each of said pinions, and a pair of coaxial rollers engaging all said pinions to maintain said pinions in mesh with all said gears.

9. An automotive differential with hydraulic locking action comprising three coaxial gears rotatable relative to one another about their common axis, a plurality of planet pinions, each of which meshes with all three coaxial gears and each of which has shaft projections at its opposite ends, a cage member having pockets therein to receive said pinions and disposed between said gears, and a pair of coaxial rollers mounted between said pinions to engage, respectively, the opposite shaft projections of all said pinions.

10. An automotive differential with hydraulic locking action comprising three coaxial gears rotatable relative to one another about their common axis, a plurality of planet pinions, each of which meshes with all three coaxial gears, a central gear in mesh with all said pinions, a cage member surrounding said central gear and having pockets to receive said pinions, and a pair of coaxial rollers mounted between said pinions to engage all said pinions.

11. An automotive differential with hydraulic locking action comprising three coaxial gears rotatable relative to one another about their common axis, a plurality of planet pinions, each of which meshes with all three coaxial gears, a central gear in mesh with all said pinions, a cage member surrounding said central gear and having pockets to receive said pinions, and a pair of coaxial rollers mounted between said pinions to engage all said pinions, said rollers being centered by said pinions and forming journals rotatably supporting said cage member.

12. An automotive differential with hydraulic locking action comprising three coaxial gears rotatable relative to one another about their common axis, a plurality of planet pinions, each of which meshes with all three gears and each of which has shaft projections at opposite ends, a cage member having pockets to receive said pinions, and a pair of coaxial rollers engaging, respectively, the opposite shaft projections of all said pinions, said rollers being centered by said shaft projections and forming journals rotatably supporting said cage member.

13. An automotive differential comprising a rotatable housing, an internal gear connected to said housing to rotate therewith, two internal gears rotatably mounted on said housing coaxially with the first internal gear and at opposite sides thereof, said three gears having substantial equal tooth zone diameters but different numbers of teeth, respectively, the first gear having a tooth number intermediate the tooth numbers of the other two gears, a plurality of planet pinions in said housing, each of which meshes with all three gears, all said pinions having the same number of teeth, the tooth number of the pinions being larger than one-third of the tooth number of the first gear, and a pair of coaxial rollers mounted between and engaging all said pinions to maintain said pinions in mesh with said gears.

14. An automotive differential comprising a rotatable housing, an internal gear connected to said housing to rotate therewith, two internal side gears rotatably mounted on said housing at opposite sides, respectively, of the first gear and coaxial with the first gear, a pair of shafts coaxial with said gears and connected, respectively, to the two side gears, a plurality of rotatable planet pinions in said housing, each of which meshes with all three of said internal gears and each of which has shaft projections at opposite ends, a pair of rollers engaging the opposite shaft projections, respectively, of all the pinions, and a cage member having pockets therein to receive said pinions and shaped to enclose said pinions around their peripheries close to the zones of mesh of the pinions with said three gears.

15. An automotive differential comprising a rotatable housing, an internal gear connected to said housing to rotate therewith, two internal side gears rotatably mounted on said housing at opposite sides, respectively, of the first gear and coaxial with the first gear, a plurality of rotatable planet pinions in said housing, each of which meshes with all three of said internal gears, a central gear disposed between and in mesh with all said pinions, a pair of rollers coaxial with said central gear and disposed at opposite ends thereof and each engaging all said pinions to hold the pinions in mesh with said gears, and a cage bored to receive said central gear and having pockets therein to receive said pinions and shaped to closely surround said pinions at their zones of mesh with said gears.

16. An automotive differential comprising a rotatable housing, a gear connected to said housing to rotate therewith, two gears rotatably mounted in said housing coaxially with the first gear, a plurality of rotatable toothed planets positioned within said housing, each of which meshes with all three of said gears, and rolling means coaxial with said gears and acting on each planet in two axially-spaced regions thereof in a plane radial of the axis of the planet and containing the axis of the planet and the axis of said coaxial gears, to exert radial pressure on said planets thereby to maintain the planets in engagement with said gears.

17. An automotive differential comprising a rotatable housing, a gear connected to said housing to rotate therewith, two gears rotatably mounted in said housing coaxially with the first gear, a plurality of rotatable toothed planets positioned within said housing, each of which meshes with all three of said gears, each of said planets having shaft projections at opposite ends thereof, and rolling means acting on the shaft projections of each planet in a plane radial of the axis of each planet and containing the axis of the planet and the axis of said coaxial gears to exert radial pressure on the planets thereby to maintain the planets in engagement with said gears.

18. An automotive differential comprising a rotatable housing, a gear connected to said housing to rotate therewith, two gears rotatably mounted in said housing coaxially with the first gear, a plurality of rotatable, toothed planets positioned within said housing, each of which meshes with all three of said gears, and rolling means acting on each planet at opposite ends thereof in two separate regions beyond the teeth thereof to exert radial pressure on said planets to maintain the planets in mesh with said gears.

19. An automotive differential comprising a rotatable housing, a gear connected to said housing to rotate therewith, two gears rotatably mounted in said housing coaxially with the first gear, a plurality of rotatable, toothed planets positioned within said housing, each of which has shaft projections at opposite ends thereof and each of which meshes with all three of said gears, and two axially spaced rollers acting, respectively, on the opposite shaft projections of all the planets to exert radial pressure on all the planets to maitnain the planets in mesh with said gears.

20. An automotive differential comprising a rotatable housing, a gear connected to said housing to rotate therewith, two gears rotatably mounted in said housing coaxially with the first gear, a plurality of rotatable, toothed planets positioned within said housing, each of which meshes with all three of said gears, a central gear disposed between and meshing with all said planets, and two axially spaced rollers coaxial with said central gear and each acting on all the planets to exert radial pressure on all the planets to maintain the planets in mesh with said three first-named gears.

References Cited in the file of this patent

UNITED STATES PATENTS

| Number | Name | Date |
|---|---|---|
| 874,852 | Lorenz | Dec. 24, 1907 |
| 1,323,245 | Borkes | Dec. 2, 1919 |
| 1,405,237 | Linden | Jan. 31, 1922 |
| 1,586,309 | Hult | May 25, 1926 |
| 1,635,162 | Joyce | July 5, 1927 |
| 1,717,784 | Johnson | June 18, 1929 |
| 1,730,183 | Wildhaber | Oct. 1, 1929 |
| 1,859,245 | Remington | May 17, 1932 |
| 1,859,462 | Perkins | May 24, 1932 |
| 2,178,613 | Seeck | Nov. 7, 1939 |
| 2,272,416 | McVoy | Feb. 10, 1942 |
| 2,489,859 | Butterworth | Nov. 29, 1949 |

FOREIGN PATENTS

| Number | Country | Date |
|---|---|---|
| 364,767 | France | Oct. 28, 1906 |